Oct. 16, 1962  R. P. HELLING ET AL  3,058,487

SLUSH PUMP VALVES

Filed Oct. 17, 1960

INVENTORS
Raymond P Helling
BY
George R. Lay 3,058,487
SLUSH PUMP VALVES
Raymond P. Helling, Bellefontaine Neighbors, Mo.
(1055 Sulky Drive, Florissant, Mo.), and George R. Lay,
1231 N. Florissant Road, Ferguson, Mo.
Filed Oct. 17, 1960, Ser. No. 63,080
1 Claim. (Cl. 137—516.19)

This invention relates to an improvement in valves used to pump abrasive fluids, and more particularly of the type used in slush pumps for circulation of drilling fluid as used in well drilling.

One object of the invention is to provide a valve assembly that is compact and does not contain the usual valve guides and stems, which are very susceptive to wear, thereby materially increasing the service life of the assembly.

Another object of the invention is to provide a valve assembly having a self contained built in force which will assist in returning the valve to its seat. On some slush pumps requiring valves with external springs, there is often the problem of the springs becoming inoperative due to the accumulation of suspended solids.

Another object of the invention is to provide a valve assembly which is relatively cheap to manufacture, which has fewer parts and which has a longer service life.

Other objects will become aparent from the following description when read in connection with the accompanying drawing in which.

Figure 2:
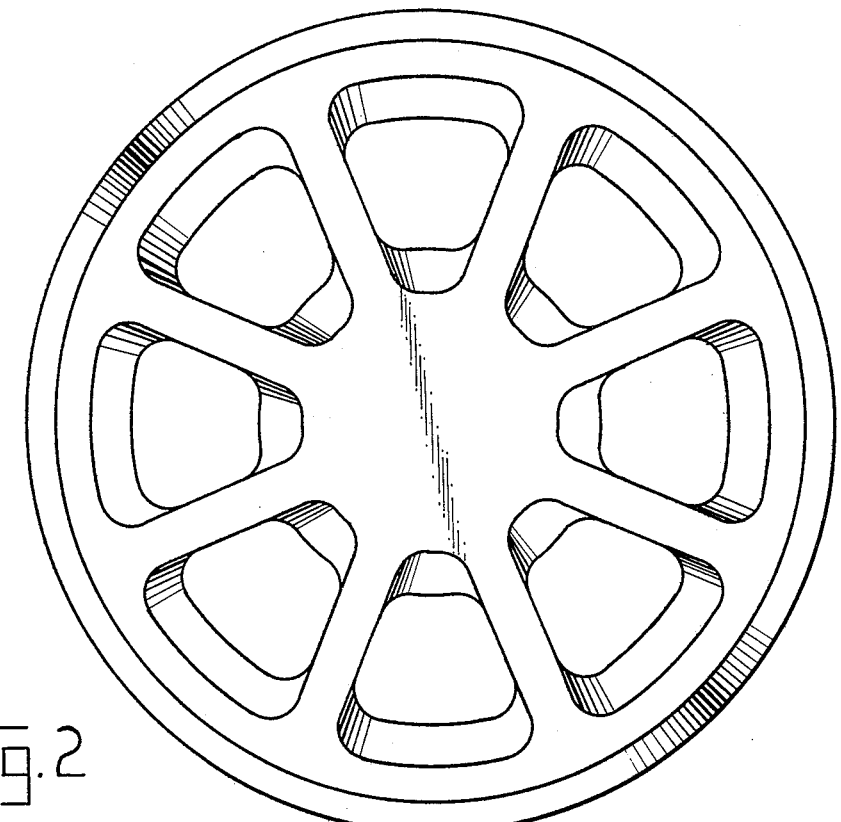
FIGURE 2 is a top view of the structure shown in FIGURE 1 taken as indicated by line 2—2, FIGURE 1.
Figure 1:
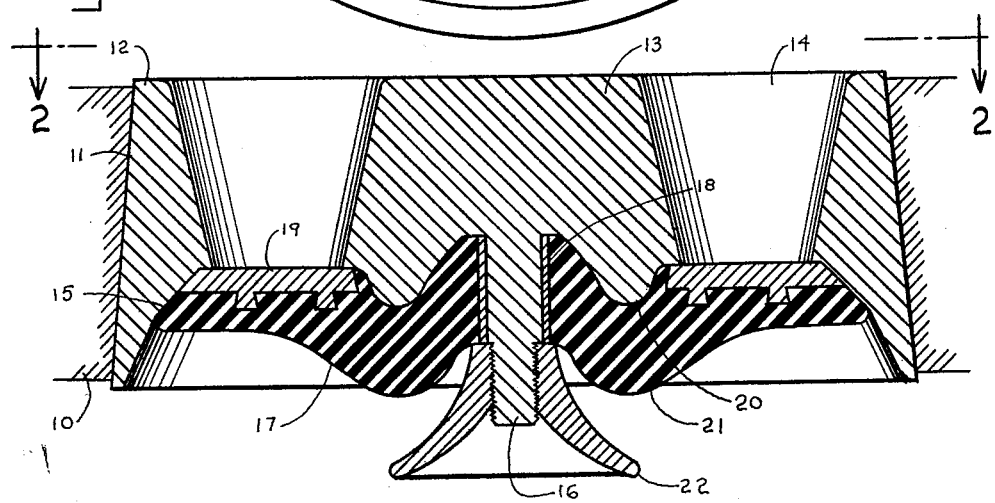
FIGURE 1 is a sectional view of a preferred embodiment of the valve assembly.

Referring to FIG. 1, the numeral 10 indicates a pump wall having a typical tapered seat 11, which is arranged to receive the valve housing. The valve housing consists of an outer annular ring 12 connected to a center hub 13 by means of the radial spider 14. At the center of hub 13 is provided a downwardly extending stud 16 which is designed to receive the valve and the internally threaded stop 22. The contoured stop 22 limits the valve travel and provides a uniform backup for the valve 17 in the open position. The valve is an assembly consisting of a contoured elastic disc-like member 17, a rigid reinforcing ring 19 and a central clamp-up and reinforcing spacer 18. The ring 19 prevents the fluid pressure from forcing the elastic material 17 past the spider 14. The ring 19 also maintains the outer peripheral portion of the valve in a relative fixed position with said ring and substantially localizes the deflection of said valve inward of said ring. The lower portion of the hub 13 at 20 is shaped to closely conform to the upper contour of 17 thereby providing a uniform backup for the elastic disc 17 when the valve is in the closed position. The actual shape of 17 defined by the upper surface 20 and the lower surface 21 may vary considerably depending on the preload desired, the characteristics of the elastic material and whether the elastic disc 17 shall act as a member in tension, compression, shear or a combination thereof.

It should be apparent, that as the valve is moved, that the elastic portion of the valve simply deflects and that there are no actual rubbing or sliding surfaces as usually associated with that of present slush pump valves having valve guides and guide bushings.

It should also be apparent that the built in force which will assist in closing the valve can be varied by changing the composition, shape and amount of elastic material used.

It should also be apparent that this is a slush pump valve which is simple, which is compact and should be easy and cheap to manufacture.

Another important feature is provided wherein the fluid between the valve and the valve housing, provides a means for absorbing the shock during closing of the valve. If this shock absorbing feature is not required, passages may be provided through the valve or the valve body to allow the fluid to escape more rapidly.

What is claimed is:

A slush pump valve assembly comprising; an annular ring, a central hub connected to said annular ring by radial arms defining a plurality of circumferentially arranged inlet flow passages terminating in an annular seating surface, a stud projecting from said central hub away from said inlet flow passages, an elastic, contoured disc-like valve member having a central portion fixedly mounted about said stud, said valve member comprising an annular outer portion having a peripheral sealing portion adjacent said seating surface for engagement with a portion thereof and an annular unsupported deflecting portion intermediate said annular outer portion and said fixed central portion, and an integral rigid reinforcing ring embedded in said annular outer portion for engagement with that portion of the seating surface not engaged by said peripheral sealing portion.

References Cited in the file of this patent

UNITED STATES PATENTS

| 157,963   | Gould      | Dec. 22, 1874 |
| 1,408,724 | Decrow     | Mar. 7, 1922  |
| 1,438,161 | Zimmerman  | Dec. 5, 1922  |
| 2,027,859 | Cohen      | Aug. 29, 1936 |
| 2,859,771 | Blagg      | Nov. 11, 1958 |
| 2,936,779 | Kindred    | May 17, 1960  |

FOREIGN PATENTS

| 8,620   | Great Britain | Apr. 16, 1903 |
| 144,437 | Australia     | Apr. 20, 1950 |